US009275021B2

(12) United States Patent
Bhatt et al.

(10) Patent No.: US 9,275,021 B2
(45) Date of Patent: *Mar. 1, 2016

(54) SYSTEM AND METHOD FOR PROVIDING A TWO-PART GRAPHIC DESIGN AND INTERACTIVE DOCUMENT APPLICATION

(75) Inventors: Ravi K. Bhatt, Chicago, IL (US); Daniel E. Winter, Lake Forest, IL (US)

(73) Assignee: BRANCHFIRE, LLC

( * ) Notice: Subject to any disclaimer, the term of this patent is extended or adjusted under 35 U.S.C. 154(b) by 959 days.

This patent is subject to a terminal disclaimer.

(21) Appl. No.: 13/414,333

(22) Filed: Mar. 7, 2012

(65) Prior Publication Data

US 2012/0166923 A1    Jun. 28, 2012

Related U.S. Application Data

(63) Continuation of application No. 12/050,049, filed on Mar. 17, 2008, now Pat. No. 8,161,369.

(51) Int. Cl.
*G06F 17/00* (2006.01)
*G06F 17/22* (2006.01)
*G06F 17/30* (2006.01)

(52) U.S. Cl.
CPC ...... *G06F 17/2247* (2013.01); *G06F 17/30056* (2013.01)

(58) Field of Classification Search
CPC .............. G06F 17/30855; G06F 17/30014; G06F 17/30017
USPC .................................. 715/202, 205, 255, 273
See application file for complete search history.

(56) References Cited

U.S. PATENT DOCUMENTS

| | | |
|---|---|---|
| 5,491,785 A | 2/1996 | Robson et al. |
| 5,669,005 A | 9/1997 | Curbow et al. |
| 5,893,914 A | 4/1999 | Clapp |
| 5,993,142 A | 11/1999 | Genov et al. |
| 6,014,668 A | 1/2000 | Tabata et al. |
| 6,040,920 A | 3/2000 | Ichiriki |
| 6,061,696 A | 5/2000 | Lee et al. |
| 6,088,707 A | 7/2000 | Bates et al. |
| 6,237,030 B1 | 5/2001 | Adams et al. |
| 6,253,231 B1 | 6/2001 | Fujii |

(Continued)

OTHER PUBLICATIONS

Kosch et al., The Life Cycle of Multimedia Metadata, IEEE 2005, pp. 80-86.*

(Continued)

*Primary Examiner* — Cong-Lac Huynh
(74) *Attorney, Agent, or Firm* — Marshall, Gerstein & Borun LLP

(57) ABSTRACT

A method and system creates an interactive multimedia document that incorporates references to multimedia files that support a particular logical step or argument presented within the document. The method and system utilizes several modules including a builder module and a presenter module. The references are configured to determine, upon selection, a visual format and a relevant portion of the multimedia file to be displayed. Thus, only one copy of the multimedia file needs to be incorporated into the document. The multimedia files include text documents, portable document files, PowerPoint® presentations, audio files, video files, voice narrated graphics, and other types of files. In some embodiments, the interactive multimedia document is a legal brief and the multimedia files include depositions, supporting case law, evidence, and other materials.

17 Claims, 14 Drawing Sheets

(56) References Cited

U.S. PATENT DOCUMENTS

| | | | |
|---|---|---|---|
| 6,374,271 B1 | 4/2002 | Shimizu et al. | |
| 6,405,225 B1 | 6/2002 | Apfel et al. | |
| 6,665,659 B1 | 12/2003 | Logan | |
| 6,683,633 B2 | 1/2004 | Holtzblatt et al. | |
| 6,745,368 B1 | 6/2004 | Boucher et al. | |
| 6,823,331 B1 | 11/2004 | Abu-Hakima | |
| 6,848,077 B1 | 1/2005 | McBrearty et al. | |
| 6,898,636 B1* | 5/2005 | Adams et al. | 709/229 |
| 6,940,491 B2 | 9/2005 | Incertis Carro | |
| 7,082,572 B2* | 7/2006 | Pea | G11B 27/105 715/720 |
| 7,243,299 B1 | 7/2007 | Rubin et al. | |
| 7,370,269 B1 | 5/2008 | Prabhu et al. | |
| 7,392,474 B2 | 6/2008 | Chen et al. | |
| 7,401,100 B2 | 7/2008 | Jung et al. | |
| 7,401,286 B1 | 7/2008 | Hendricks et al. | |
| 7,437,659 B2 | 10/2008 | Taniwaki et al. | |
| 7,444,589 B2 | 10/2008 | Zellner | |
| 7,454,694 B2 | 11/2008 | Graham | |
| 7,455,233 B2 | 11/2008 | Rathus et al. | |
| 7,467,352 B2 | 12/2008 | Arneson et al. | |
| 7,490,288 B2 | 2/2009 | Undasan | |
| 7,496,829 B2 | 2/2009 | Rubin et al. | |
| 7,562,287 B1 | 7/2009 | Goldstein et al. | |
| 7,577,902 B2 | 8/2009 | Hong et al. | |
| 7,584,411 B1 | 9/2009 | Alexander et al. | |
| 7,590,631 B2 | 9/2009 | Rail | |
| 7,689,928 B1* | 3/2010 | Gilra | 715/787 |
| 7,707,139 B2 | 4/2010 | Okamoto et al. | |
| 7,733,367 B2 | 6/2010 | Packer | |
| 7,739,622 B2 | 6/2010 | DeLine et al. | |
| 7,757,168 B1 | 7/2010 | Shanahan et al. | |
| 7,761,591 B2 | 7/2010 | Graham | |
| 7,814,425 B1* | 10/2010 | O'Shaugnessy et al. | 715/752 |
| 8,010,897 B2 | 8/2011 | Paxson | |
| 8,161,369 B2 | 4/2012 | Bhatt et al. | |
| 8,312,660 B1* | 11/2012 | Fujisaki | 42/70.11 |
| 8,577,930 B2* | 11/2013 | Rajan | G06F 17/30713 707/804 |
| 8,909,658 B2* | 12/2014 | Lee | G06F 17/30011 707/758 |
| 9,043,270 B2* | 5/2015 | Nichols | G06F 17/30017 707/725 |
| 2001/0028364 A1* | 10/2001 | Fredell et al. | 345/751 |
| 2003/0191852 A1* | 10/2003 | Incertis | G06F 17/30876 709/232 |
| 2005/0071776 A1 | 3/2005 | Mansfield et al. | |
| 2005/0149861 A1 | 7/2005 | Bishop et al. | |
| 2005/0251758 A1* | 11/2005 | Cummins | G06F 9/4443 715/838 |
| 2006/0015821 A1 | 1/2006 | Jacques Parker et al. | |
| 2006/0212812 A1 | 9/2006 | Simmons et al. | |
| 2006/0218191 A1 | 9/2006 | Gopalakrishnan | |
| 2007/0005616 A1 | 1/2007 | Hay et al. | |
| 2007/0006078 A1 | 1/2007 | Jewsbury et al. | |
| 2007/0067716 A1 | 3/2007 | Jung et al. | |
| 2007/0073747 A1 | 3/2007 | Jung et al. | |
| 2007/0074246 A1 | 3/2007 | Portnykh et al. | |
| 2007/0078883 A1* | 4/2007 | Hayashi et al. | 707/102 |
| 2007/0078898 A1* | 4/2007 | Hayashi et al. | 707/104.1 |
| 2007/0118554 A1* | 5/2007 | Chang et al. | 707/102 |
| 2007/0118794 A1 | 5/2007 | Hollander et al. | |
| 2007/0121846 A1 | 5/2007 | Altberg et al. | |
| 2007/0133029 A1 | 6/2007 | Deriaguine et al. | |
| 2007/0136264 A1 | 6/2007 | Tran | |
| 2007/0255616 A1 | 11/2007 | Gjerstad et al. | |
| 2008/0016164 A1 | 1/2008 | Chandra | |
| 2008/0229181 A1 | 9/2008 | Jung et al. | |
| 2008/0235585 A1 | 9/2008 | Hart et al. | |
| 2008/0301540 A1* | 12/2008 | Sava et al. | 715/205 |
| 2009/0013242 A1 | 1/2009 | Zellner | |
| 2010/0011281 A1 | 1/2010 | Hong et al. | |
| 2010/0037305 A1 | 2/2010 | Griffith et al. | |
| 2010/0153832 A1 | 6/2010 | Markus et al. | |
| 2010/0161717 A1 | 6/2010 | Albrecht et al. | |
| 2013/0124546 A1* | 5/2013 | Wormley | H04L 63/101 707/758 |
| 2014/0281952 A1* | 9/2014 | Zhang | 715/273 |

OTHER PUBLICATIONS

Sheth et al., Media-Independent Correlation of Information: What? How?, IEEE 1996, pp. 1-10.*

Hunter, "Enhancing the Semantic Interoperability of Multimedia through a Core Ontology," IEEE, 2003, pp. 49-58.

Goularte et al., "Interactive Multimedia Annotations: Enriching and Extending Content," ACM, 2004, pp. 84-86.

Office Action for U.S. Appl. No. 12/050,049 dated Jun. 24, 2011.

* cited by examiner

FIG. 7

The first feature of the claimed pegylated liposomes that plaintiffs clearly have no proof of inventorship for is a feature recited in claim 18 of the '556 patent. (Exh. 5 at col. 24, DEFENDANTS' MOTION FOR SUMMARY JUDGMENT ON CASE NO. C 02-5524 S1 lns. 55-65). This feature relates to the nature of the components making up the liposome itself. Before discussing the invention, we briefly illustrate these components.

A single liposome itself is a hollow microscopic sphere, much smaller than a human cell. The cross-sectional structure of a typical liposome is shown below: A close look at a liposome shows that it is made up of two layers of tiny molecules called lipids; An even closer look shows that individual lipids generally comprise a head and two tails. The heads are "hydrophilic", meaning they like water. The tails are "hydrophobic", meaning they do not like water. Lipids occur naturally in animal and plant cells. (See generally, Exh. 9, see, e.g., at 1, 3, and 10). Drs. Yau-Young and Redmann were working on liposomes for diagnostics and therepeutic purposes as early as the summer of 1988. (Deposition of Dr. Frank Hanson at page 21)

3. The invention of Drs. Woodle, Martin, Yau-Young and Redemann: liposome lifetime is independent of lipid saturation The tails in the lipids are fatty acid chains, and like any fat can be either saturated or unsaturated. In the prior art, it was believed that in order to be stable in the bloodstream, the liposomes had to be made of saturated liposomes. The '556 patent explains this earlier thinking on what it took to make long-circulating liposomes:

*FIG. 11*

A. Background of the Technology

In their Amended Complaint, the plaintiffs seek to change the inventorship of U.S. Patent No. 5,013,556, which is now owned by defendant Alza Corporation. The '556 patent concerns a drug delivery system made of tiny spherical vessels called liposomes. Specifically, the patent concerns a way of attaching polyethylene glycol ("PEG") to liposomes to make them circulate longer in the blood.

1. Alza's claimed pegylated liposomes

At the time the defendant-inventors of the patent-in-suit were developing their pegylated liposomes, pegylated liposomes themselves were not new. Dr. Barry Sears had long ago disclosed pegylated liposomes in his own patent. (Exh. 3). Indeed, during the prosecution of a patent application related to the '556 patent, the Patent Office expressly stated that Sears' patent disclosed pegylated liposomes: "Sears I discloses a *liposome* composition comprising a mixture of a natural and synthetic phospholipids, wherein the synthetic phospholipid is phosphatidylethanolamine *derivatized with polyethylene glycol*." (Exh. 4 at ALZA017522) (emphasis added).

Consequently, in the '556 patent, the Alza inventors did not claim all pegylated liposomes. Instead, each of the 33 claims in the '556 patent limits the subject matter of the claimed inventions to a specific kind of pegylated liposome—both in terms of what the liposome is made of and what functions it is capable of performing. ('556 Patent)

This motion focuses on key features of the claimed inventions that plaintiffs cannot genuinely dispute were not contributed by them. These key features are discussed in the subsections below.

*FIG. 14*

SYSTEM AND METHOD FOR PROVIDING A TWO-PART GRAPHIC DESIGN AND INTERACTIVE DOCUMENT APPLICATION

CROSS-REFERENCE TO RELATED APPLICATION

This application is a continuation of U.S. application Ser. No. 12/050,049, filed Mar. 17, 2008, the disclosure of which is hereby incorporated herein by reference in its entirety for all purposes.

TECHNICAL FIELD

The following disclosure relates to a system and a method for providing a two-part graphic design and interactive media application that includes a builder module to create digital interactive multimedia documents and a presenter module to provide a seamless, self-guided viewer experience with access to linked media files.

BACKGROUND

Conventional documents incorporate media files into a single flattened document that is typically in PDF format. Conventional methods also require a user to use multiple applications, such as, for example, Adobe™, Photoshop™, Illustrator™, Acrobat™, and Flash™, and multiple copies of media files referenced by hyperlinks to allow navigation to the linked documents. However, in order to follow hyperlinks and other references to media files, the viewers must follow the reference completely, and the viewer is "relocated" to the linked file so that the primary focus of the user is drawn away from the document that is the source of the reference, to the media file that merely supports the document. Thus, there is no technology that exists to allow the design and presentation of focused dynamic documents that incorporate media files in various formats within a single application and within a single instance of the document.

BRIEF DESCRIPTION OF THE DRAWINGS

FIGS. 6-14 are screen shots of a viewer's view of an exemplary dynamic interactive multimedia document.

DETAILED DESCRIPTION

Figure 1:
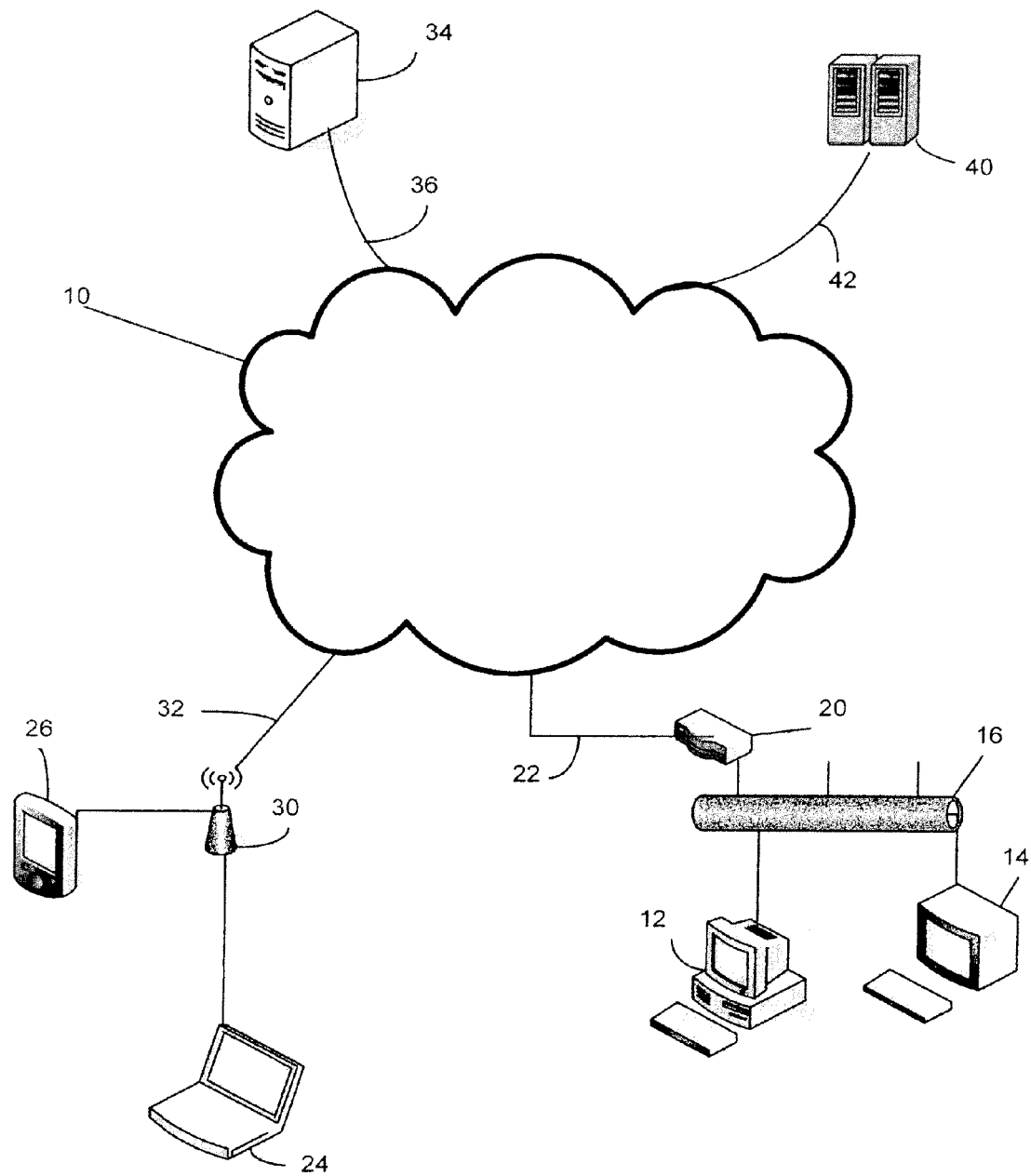
FIG. 1 is a diagram of one example of a network and network devices including a user access point and a web-based information management system.

FIG. 1 illustrates an example of a network typical of the World Wide Web. A network 10 may be a virtual private network (VPN), or any other network that allows one or more computers, communication devices, databases, etc., to be communicatively connected to each other. The network 10 may be connected to a PC 12 or a computer terminal 14 by any means able to communicate electronic signals. In one embodiment, the components may be connected to the network 10 via an Ethernet 16 and a router 20, or a land line 22.

The network 10 may also be wirelessly connected to a laptop computer 24 and a personal data assistant 26 via a wireless communication station 30 and a wireless link 32. Similarly, a server 34 may be connected to the network 10 using a communication link 36. Also, an information management system 40 may be connected to the network 10 using another communication link 42. Where the network 10 includes the Internet, data communication may take place over the network 10 via an Internet communication protocol. In operation, the client PC 12 may view or request data from any other computing device connected to the network 10. Further, the PC 12 may send data to any other computing device connected to the network 10.

Figure 2:
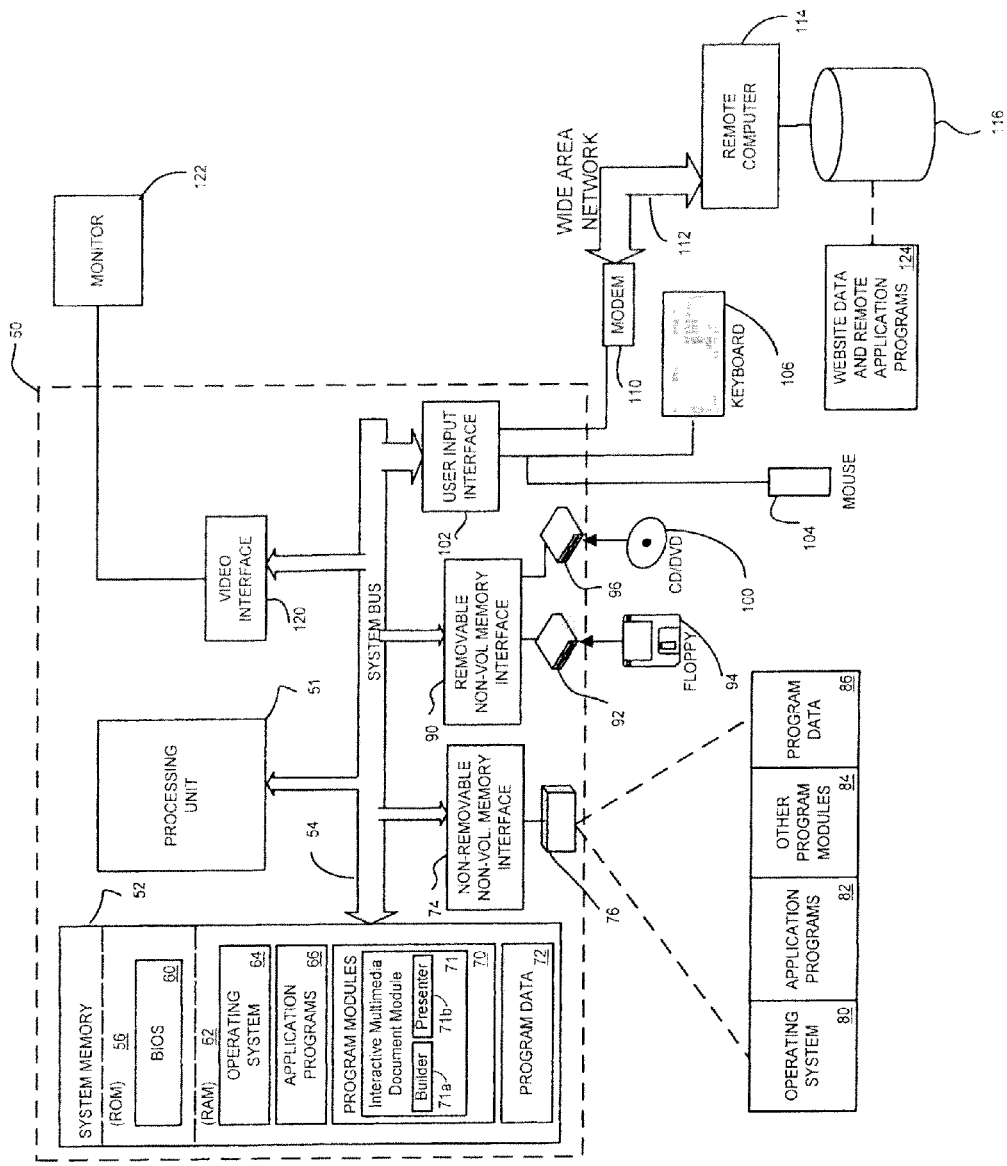
FIG. 2 is a diagram of one example of a general computing device that may operate in accordance with the claims.

FIG. 2 illustrates a typical computing device 50 that may be connected to the network 10 of FIG. 1 and participate in a distributed computing environment such as the World Wide Web and communicate with an information management system 40. FIG. 2 may also be an example of an appropriate computing system on which the claimed apparatus and claims may be implemented, however, FIG. 2 is only one example of a suitable computing system and is not intended to limit the scope or function of any claim. The claims are operational with many other general or special purpose computing devices such as PCs 12, server computers 34, portable computing devices such as a laptop 24, consumer electronics 26, mainframe computers, or distributed computing environments that include any of the above or similar systems or devices.

With reference to FIG. 2, a system for implementing the steps of the claimed apparatus may include several general computing devices in the form of a computer 50. The computer 50 may include a processing unit, 51, a system memory, 52, and a system bus 54 that couples various system components including the system memory 52 to the processing unit 51. The system bus 54 may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

Computer 50 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 50. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. The system memory 52 may include storage media in the form of volatile and/or non-volatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program modules 70, and program data 72. The program modules 70 may also include, for example, an interactive multimedia document module 71 to create and view interactive multimedia documents, as further described below. The interactive multimedia document module 71 may also include any number of sub-modules, for example, a builder module 71a, and a presenter module 71b that may be used by the interactive multimedia document module 71 to create interactive multimedia documents using the computer 50. Additionally, each sub-module may include any number of modules including, for example, an embedding module of the builder module 71a and a video module of the presenter module 71b.

The system memory 52 may include storage media in the form of volatile and/or non-volatile memory such as ROM 56 and RAM 62. A basic input/output system 60 (BIOS), containing algorithms to transfer information between components within the computer 50, may be stored in ROM 56. Data or program modules that are immediately accessible or are presently in use by the processing unit 51 may be stored in RAM 62. Data normally stored in RAM while the computer 50 is in operation may include an operating system 64, application programs 66, program modules 70, and program data 72.

The computer 50 may also include other storage media such as a hard disk drive 76 that may read from or write to non-removable, non-volatile magnetic media, a magnetic disk drive 92 that reads from or writes to a removable, non-volatile magnetic disk 94, and an optical disk drive 96 that reads from or writes to a removable, nonvolatile optical disk 96. Other storage media that may be used includes magnetic tape cassettes, flash memory cards, digital versatile disks, digital video tape, solid state RAM, and solid state ROM. The hard disk drive 76 may be connected to the system bus 54 through a non-removable memory interface such as interface 74. A magnetic disk drive 92 and optical disk drive 96 may be connected to the system bus 54 by a removable memory interface, such as interface 90.

The disk drives 92, 96 transfer computer-readable instructions, data structures, program modules, and other data for the computer 50 to different storage media 94, 100 for storage. A hard disk drive 76 may store an operating system 64, application programs 66, other program modules 70, and program data 72. These components may be the same or different from operating system 80, application programs 82, other program modules 84 and program data 86. The components associated with the hard disk drive 76 may be different copies of the same elements (e.g., 64, 66, 70, 71, 71a, 71b, 72) that are associated with RAM 62.

The user may interact with the computer 50 through input devices such as a keyboard 106 or a pointing device 104 (i.e., a mouse). A user input interface 102 may be coupled to the system bus 54 to allow the input devices to communicate with the processing unit 51. A display device such as a monitor 122 may also be connected to the system bus 54 via a video interface 120.

The computer 50 may operate in a networked environment using logical connections to one or more remote computers 114. The remote computer 114 may be a PC 12, a server 34, a router 20, or other common network node as illustrated in FIG. 1. The remote computer 114 typically includes many or all of the previously-described elements regarding the computer 50, even though only a memory storage device 116 is illustrated in FIG. 2. Logical connections between the computer 50 and one or more remote computers 114 may include a wide area network (WAN) 112. A typical WAN is the Internet. When used in a WAN, the computer 50 may include a modem 110 or other means for establishing communications over the WAN. The modem 110 may be connected to the system bus 54 via the user input interface 102, or other mechanism. In a networked environment, program modules 71 depicted relative to the computer 50, may be stored in the remote memory storage device 116. By way of example, and not limitation, FIG. 2 illustrates website data and remote application programs 124 as residing on the memory device 116. As may be appreciated, other means of establishing a communications link between the computer 50 and the remote computer 114 may be used.

As previously described, the method and system may build and view dynamic documents with the use of an information management system 40 by utilizing a two-part application to create digital interactive multimedia documents and to provide a seamless, self-guided user experience. This is a novel medium that combines the benefits of hyperlinked documents, like Adobe® PDF with interactive audiovisual media, like PowerPoint® and Flash®. This is a substantial technological improvement over conventional documents that incorporate multiple media files where:

a). the document is typically created in Word® and then formatted and combined with various images before being flattened, so that the viewer of the document is essentially looking at a static document without links to other files;
  b). conventional PowerPoint® presentations are employed, which allow only limited interactivity and limited navigation through a rigid sequence of "slide" screens with no scrolling or zoom-in, and no ability to "hover" a new window with linked media;
  c). Adobe® Flash™-type technology is typically employed, which requires a highly skilled operator to create interactive files from whole cloth; and
  d). conventional document and media file integration techniques are employed and require embedding several copies of a single media file into a final document in order to view different portions of the embedded document or media file.

Figure 3:
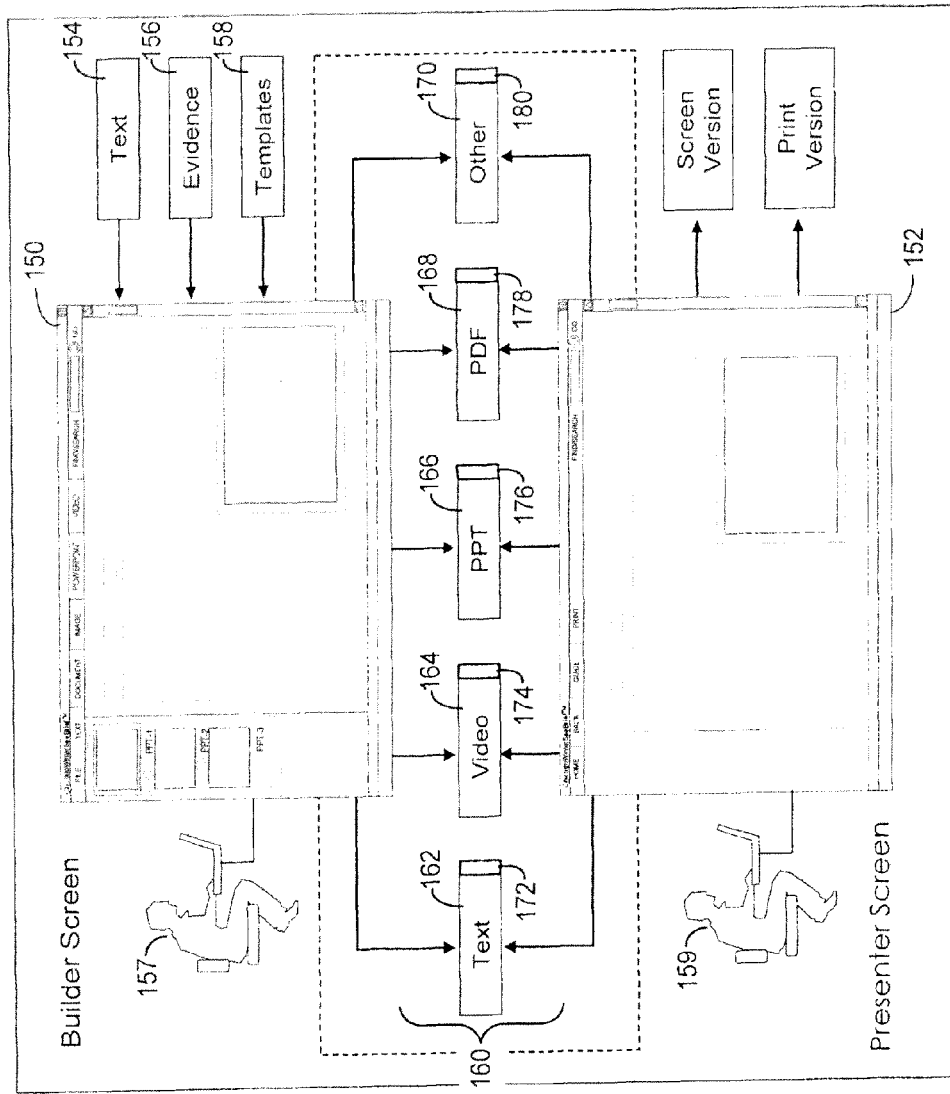
FIG. 3 is a block diagram illustrating the interrelationships between a builder screen and a presenter screen.

FIG. 3 illustrates a block diagram of an exemplary builder screen 150 and presenter screen 152 that are utilized in building and viewing interactive multimedia documents that incorporate references to exhibits or other supporting documents, such as, for example, legal briefs. The builder screen 150 is particularly effective in its ability to enable non-technical people of ordinary clerical computer skills, such as, for example, secretaries, paralegals, attorneys, managers, etc., to design and produce full-featured documents with a look and feel of those documents produced by a professional graphic designer. Embodiments may include a text portion 154 of a document (e.g., a legal brief, a motion, a memorandum, etc.), evidence 156 that supports a syllogistic or logical step of an argument presented by the text portion 154 of the document, and a variety of templates 158 that allow a user 157 at the builder screen 150 to incorporate the evidence 156 into the text 154 to present the finished interactive multimedia document to a viewer 159 in a predictable and visually-flowing manner. For example, the evidence 156 may be a variety of media files 160 including text 162, video 164, PowerPoint® 166, Portable Document Files 168, and other files 170 (e.g., audio, digital images, etc.) that may be incorporated, as described below, into an interactive multimedia document.

A system for building and viewing dynamic documents may include a variety of structures and components as generally described in relation to FIGS. 1-3. Therefore, the system configurations described in relation to FIGS. 1-3 may include any combination of elements described in relation to each figure.

Figure 4:
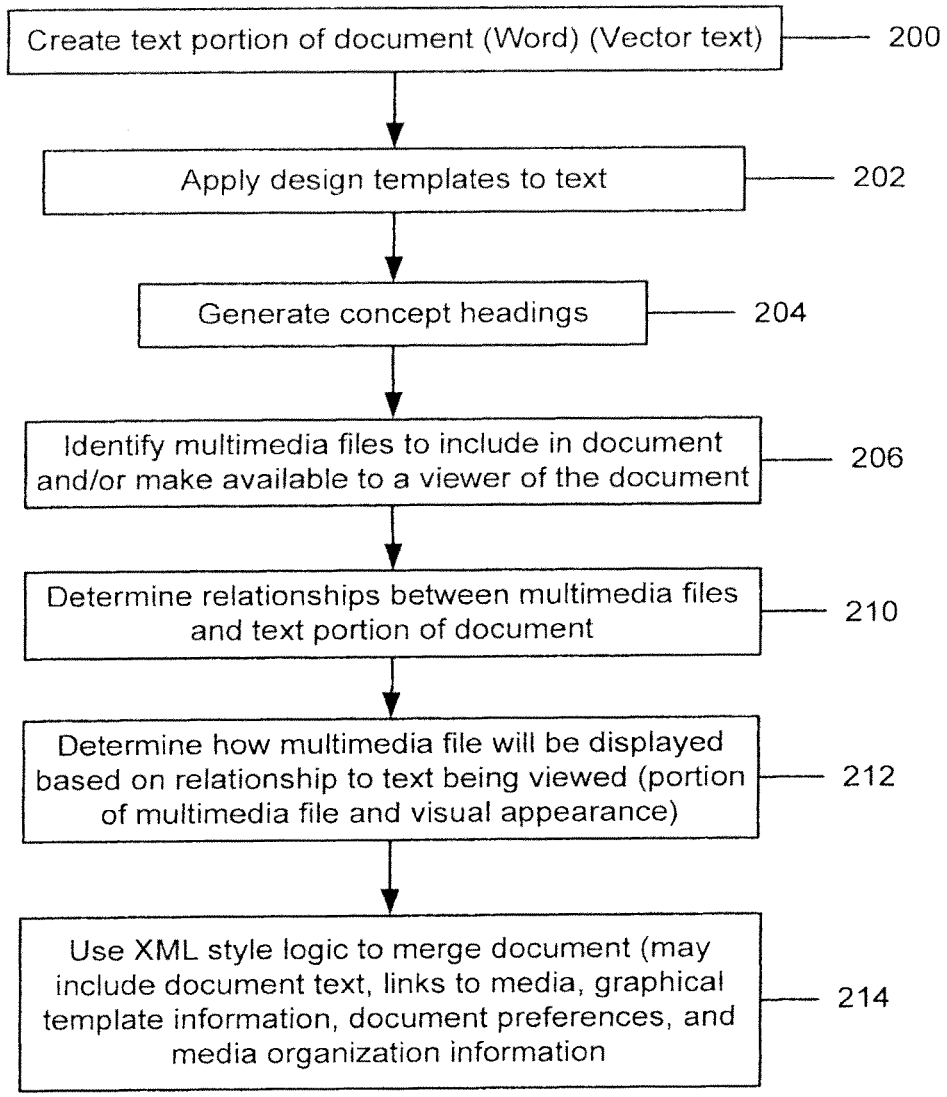
FIG. 4 is a flowchart describing a method of one example of building a dynamic interactive multimedia document.
Figure 6:
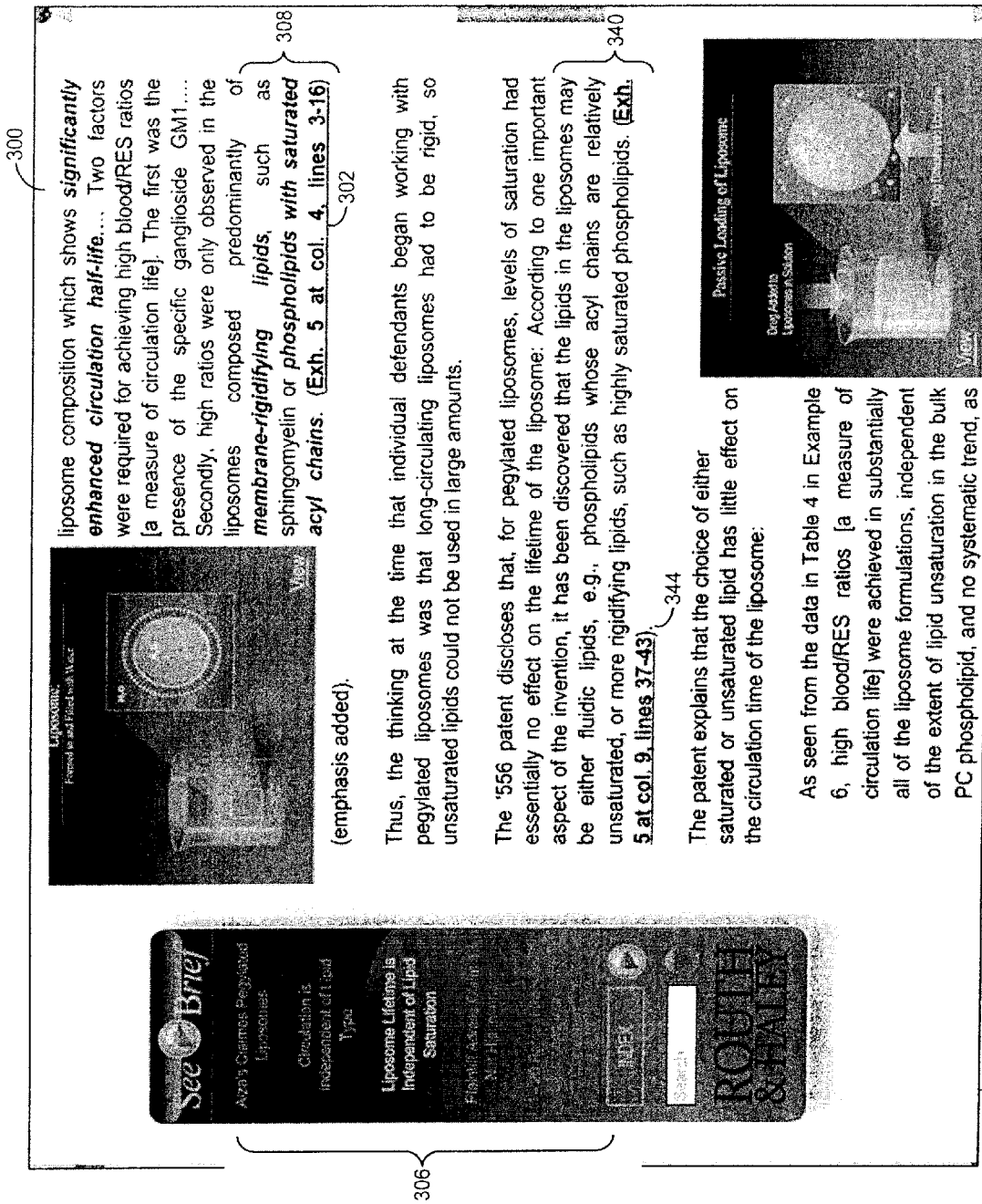

FIG. 4 illustrates a flowchart describing a method of one example of building a dynamic interactive multimedia document (hereinafter, "the document" or "the dynamic document") 300 (FIG. 6). The method may begin when a user 157 creates a text portion 154 (FIG. 3) of the document 300 using a word processing application, such as, for example, Microsoft Word™ (block 200). The user 157 may utilize the builder screen 150 which incorporates a WYSIWYG interface to provide "stay at home" navigation to create a distinctive view for a viewer 159 that remains located in the home page of the document 300. This allows the user 157 to manipulate text 154, images, and other media files 160 to achieve enhanced appearance of the document 300 through application of the design templates 158 and through user design choices as related to text 154, colors, and images. The text 154 remains in vector format, so the content remains malleable during the entire building/creation process and is easily accessible to all members of a team responsible for creating the document 300, assuming more than one person is involved in the creation of the document 300.

The WYSIWYG interface does not require a user 157 to write any specific code or create hyperlinks to media files 160, but allows the user 157 to simply drag and drop media files 160 and portions or sections of media files 160 into specific locations of the document 300. The builder module 71*a* (FIG. 2) may employ a form of markup language (e.g., SGML, XML, etc.) to describe the document 300 including a number of references 302 (FIG. 6) to relevant media files 160 that include media file metadata 172, 174, 176, 178, 180 (FIG. 3). A media file 160 may be any type of audio, video, or text file that may be combined with the text portion 154 of the document 300, in whole or in part, as support for a syllogistic or logical step of an argument or element of an argument that is presented to a user who views the document 300. The media file 160 may be defined or described by media file metadata 172-180 that may identify any aspect of the media file 160. For example, media file metadata 172-180 may describe a specific portion of the media file 160 (e.g., a paragraph within a text media file, or a segment of audio or video, etc.) that supports a syllogistic or logical step of an argument being presented to the viewer 159 on the presenter screen 152 at a specific location of the document 300. The media file metadata 172-180 may be employed by the builder module 71*a* as a "tag" or reference to describe the specific portion of the media file 160 so that the portion may then be recalled and formatted by the presenter module 71*b* to be presented to the viewer 159 in the presenter screen 152. Therefore, portions of the media file 160 may be described by a first type of media file metadata 172-180, while a format of the portion may be described by a second type of media file metadata 172-180.

To embed formatted portions of the media files 160 into the document 300, with the builder module 71*a*, a reference (e.g., a hyperlink) 302 (FIG. 6) to a media file 160 may include both the portion of the media file 160 and its format (e.g., color, highlighting, underlining, audio volume, video properties, etc). By including separate metadata tags for various portions and characteristics of the media file 160, the presenter module 71*b* may format the portions for viewing within the presenter screen 152 upon the viewer 159 selecting the reference 302. By formatting the portions of the media file 160 at the time the viewer 159 selects the reference 302 while viewing the document 300, there is no need for the document 300 to store several pre-formatted copies of each media file 160. Thus, only one copy of the media file 160 may be included with the document 300 to present any portion of the media file 160 in any format. Further, by only including one copy of the media file 160, the amount of memory 62 (FIG. 2) used by the document 300 may be reduced.

In some embodiments, upon viewing the a portion of the document 300 that includes a reference 302 to a portion of a media file 160, the viewer 159 may view the portion of the media file 160 by a passive or affirmative action. For example, the viewer 159 may activate the reference 302 with a mouse click or roll over action, selecting the relevant media file 160 or portion of the media file from a menu, or any other act. The reference 302 to the media file 160 may include any amount of media file metadata 172-180 to allow the presentation of the media file 160 or a relevant portion of the media file 304 (FIG. 7) to the viewer 159 within the context of the argument presented by the document 300. Upon selection of the reference 302, the presenter module 71*b* may utilize the media file metadata 172-180 to format and present a portion of the media file 304 to supplement the viewer's 159 understanding of a particular syllogistic or logical step of the argument that is being viewed within the presenter screen 152.

Figure 7:
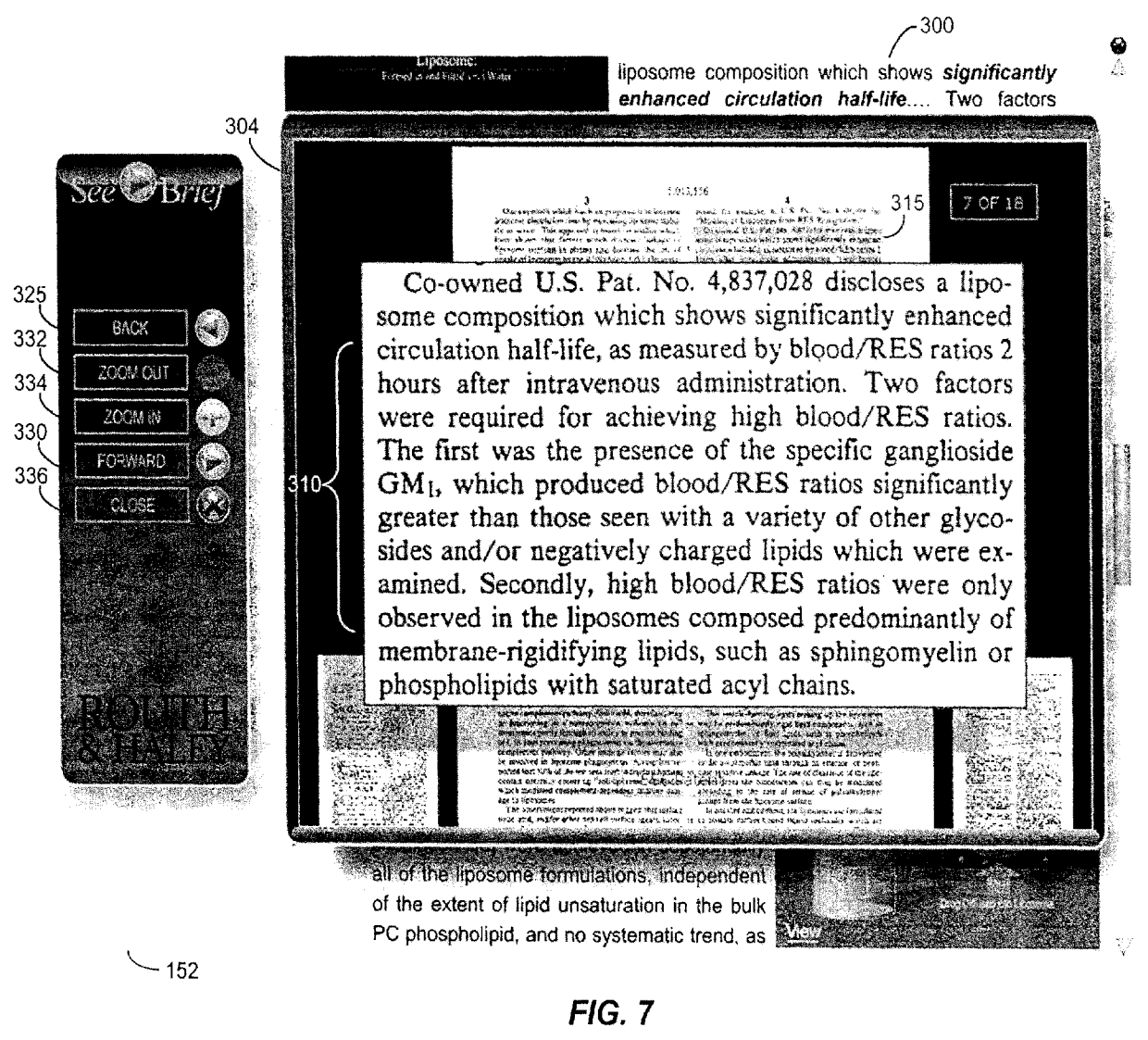

As described above, the viewer 159 is able to view a formatted, relevant portion of the media file 304 within the context of the document 300 as a whole and without pulling the viewer's focus to irrelevant portions of the media file 160. This "stay at home" navigation aspect is important because it allows the creators 157 to prevent viewers 159 from viewing the media files 160 randomly. Instead, viewers 159 are presented with the formatted, relevant portion of the media file 304 content in context and for the purpose of substantiating particular arguments discussed within relevant portions of the document 300. Thus, the creator 157 is able to create a tightly controlled experience for viewers 159 of the document 300, while still allowing the viewer 159 to interpret relevant portions of supporting media files 160. In some embodiments, the "stay at home" navigation is accomplished by causing the formatted, relevant portions of the media files 304 to be presented to the viewer 159 in such a way that they appear to hover over the "home" portion of the document 300. An example of this concept is illustrated in FIGS. 6 and 7, where FIG. 7 illustrates a formatted, relevant portion of a media file 304 (a portion of a text document 162) hovering over a main page of a legal brief 300. The portion of the media file 304 is illustrated stylistically as a floating window over a dynamic document 300 that appears to be slightly shaded. When the hovering formatted, relevant media file 304 (portion of a text document 162) is closed, the viewer 159 is returned to the exact same place in the main document 300 that they were prior to viewing the portion 304. Thus, the viewer 159 is not required to use a forward and back button or to open multiple windows to view the relevant portions of the media files 304. This greatly increases the likelihood that the viewer 159 will not become lost or distracted while viewing the supporting media files 160. Instead, the viewer 159 will activate a reference 302 to refer to the relevant portions of the media files 304 only in conjunction with specific portions of the dynamic document 300. Thus, the relationships between the portions of the media files 304 and the points or arguments discussed in the dynamic document 300 remain closely connected.

The creator 157 may also prevent the viewer 159 from altering the content of the media files 160. In other words, the content is locked by the creator 157, but in a substantially different way from a PDF document.

Referring again to FIG. 4, the creator is provided the ability to apply design template(s) or graphical template(s) 158 (FIG. 3) to the text 154 to control the look and style of one or more of the text 154 and relevant portions of the media files 304 (block 202). The templates 158 may include, for example, borders, colors, positions of media window(s), shading, highlighting color, etc. To control the formatting of the portions of the media files 304, the templates 158 may employ metadata 172-180, as previously described. It is envisioned that a default template 158 could be implemented as well as a number of alternative templates that a creator 157 could choose from when building a dynamic document 300.

The creator 157 may also be permitted to generate concept headings 306 (block 204), such as those shown in FIG. 6. The concept headings are purely optional and may be generated at any time during the creation of the dynamic document 300. These concept headings 306 may be linked to and correspond to particular sections within the dynamic document 300 so that, upon selection by the viewer 159, the presenter module 71b presents a portion of the document 300 that corresponds to the heading 306.

The creator 157 is also permitted to identify the media files 160 to include in the dynamic document 300 and/or make available to a viewer 159 of the dynamic document 300 (block 206) using the builder module 71a (FIG. 2). The creator 157 is provided the ability to browse and select media files 160 and specific portions of the media files 304 that are then linked to specific portions of the dynamic document 300. For example, the creator 157 is able to locate text from documents 162, segments of video 164, slides from PowerPoint presentations 166, portions of PDF documents 168, and other relevant files 170 in context and in proximity to the facts and arguments discussed in the text of the dynamic document 300. Therefore, the creator 157 can strategically place references 302 to relevant portions of the media files 304 in the dynamic document 300 to create the most persuasive viewer experience. In other words, after one or more media files 160 have been identified, the creator 157 may determine the relationships between specific portions of the media files 304 (text, video, images, graphics, voice-narrated graphics, animation, etc.) and text portions 154 of the dynamic document (block 210).

The method may then allow the creator 157 to determine how the multimedia file will be displayed based on its relationship to the text 154 being viewed (block 212). This will include both the specific portion of the multimedia file 304 as well as the visual appearance of the portion. The dynamic document 300 may also include media organization information that may contain both media categories, such as, for example, exhibits, cases, statutes, demonstratives, etc., and the location of the media (pointers to the specific folders where the content is stored). This media information, if included, may be used to generate a table of contents view and to search media files 160 or relevant portions of the media files 304 by content type. The dynamic document 300 may also include graphical template information and document preferences that may contain viewing preferences for the text portion 154 of the document 300 including, for example, text font size and style, line spacing, color scheme, size, color, and appearance of various graphical elements, appearance of table of contents, etc. The dynamic document 300 may then be merged using XML style logic that may include the document text 154, links to media files 160, media file metadata 172-180 describing a location and format of the relevant portion of the media file 304, graphical template information, document preferences, and media organization information (block 214).

Figure 5:
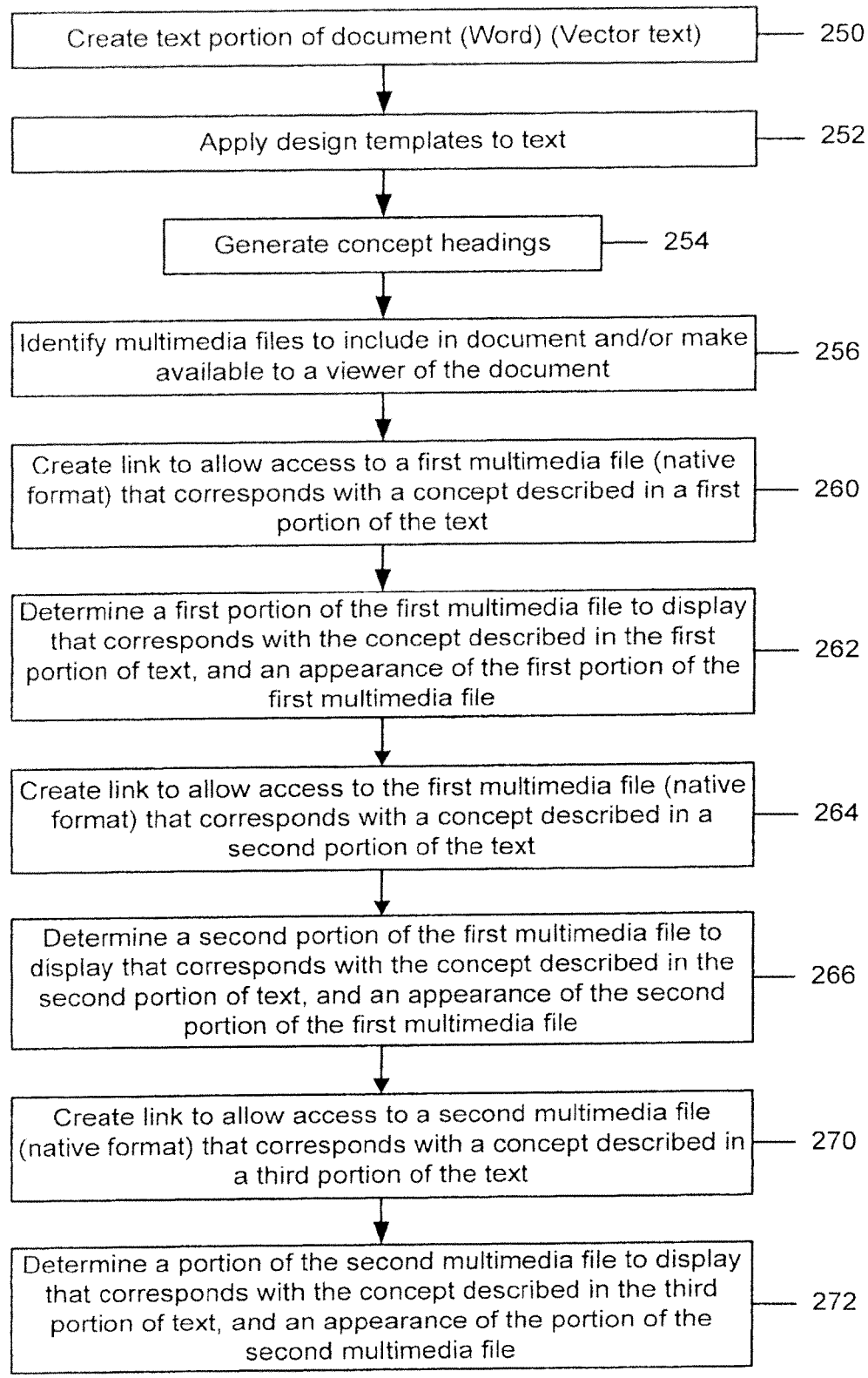
FIG. 5 is a flowchart describing an alternative method of building a dynamic interactive multimedia document.

FIG. 5 illustrates a flowchart describing an alternative method of building a dynamic interactive multimedia document 300 (FIG. 6). The method may begin when a user 157 (FIG. 3) creates a text portion 154 of a document using a word processing application, such as, for example, Microsoft Word™ (block 250). The user 157 may utilize the builder screen 150 of the builder module 71a (FIG. 2) that incorporates a WYSIWYG interface to provide "stay at home" navigation, as described above, to create a distinctive viewer 159 experience that remains located in the home page of the document 300. The creator 157 of the dynamic document 300 is provided the ability to apply design template(s) or graphical template(s) 158 to one or more of the text 154 and the portions of the media files 304 to control their look and style (block 252). This may include, for example, borders, colors, positions of media window(s), shading, highlighting color, etc. The creator 157 may also be permitted to generate concept headings (block 254), such as those shown in FIG. 6. The concept headings are purely optional and may be generated at any time during the creation of the dynamic document. These concept headings may be linked to and correspond to particular sections within the dynamic document so that a viewer 159 is taken directly to the appropriate portion of the document 300 after selecting the appropriate heading.

Using the builder module 71a (FIG. 2), the creator 157 is also permitted to identify the media files 154 to include in the dynamic document 300 and/or make available to a viewer 159 of the dynamic document 300 (block 256). The creator 157 is provided the ability to browse and select a first media file 160 (e.g., a text document 162) and determine the relevant portion 304 and format of the media file. The builder module 71a then associates metadata 172-180 describing the media file relevant portion 304 and its format with the media file 160 (e.g., 172). The creator 157 may then use the builder module 71a to create a reference 302 that includes the metadata 172 and to associate the reference 302 with a portion of the dynamic document 300 that would be supported by the selected portion 304. In other words, the creator 157 is able to locate images and links to digital documentary or video evidence, etc. that support a particular syllogistic or logical step of the argument presented by the text 154 of the document 300 to create a reference 302 to the relevant portion of the media file 304. The creator 157 then places the reference 302 in proximity to the facts and arguments discussed in the text 154 of the dynamic document 300.

Upon selection of the reference 302 by the viewer 159, the presenter module 71b interprets the metadata 172 of the reference 302 to present the formatted, relevant portion of the media file 304. Therefore, the creator 157 can strategically place images and linked evidence in the dynamic document 300 to create a persuasive viewer experience. More specifically, the creator 157 is provided with the ability to access the first multimedia file (e.g., 162), while still in its native format, that corresponds with a concept described in the first portion of the text 308 (FIG. 6) (block 260). This is illustrated in FIG. 6 which shows a "home" page of a dynamic legal brief document 300 that includes a reference 302 or hyperlink to "Plaintiff Exhibit P15." This reference 302 is linked to the first multimedia file 162 which is an issued U.S. patent, as shown in FIG. 7.

Figure 8:
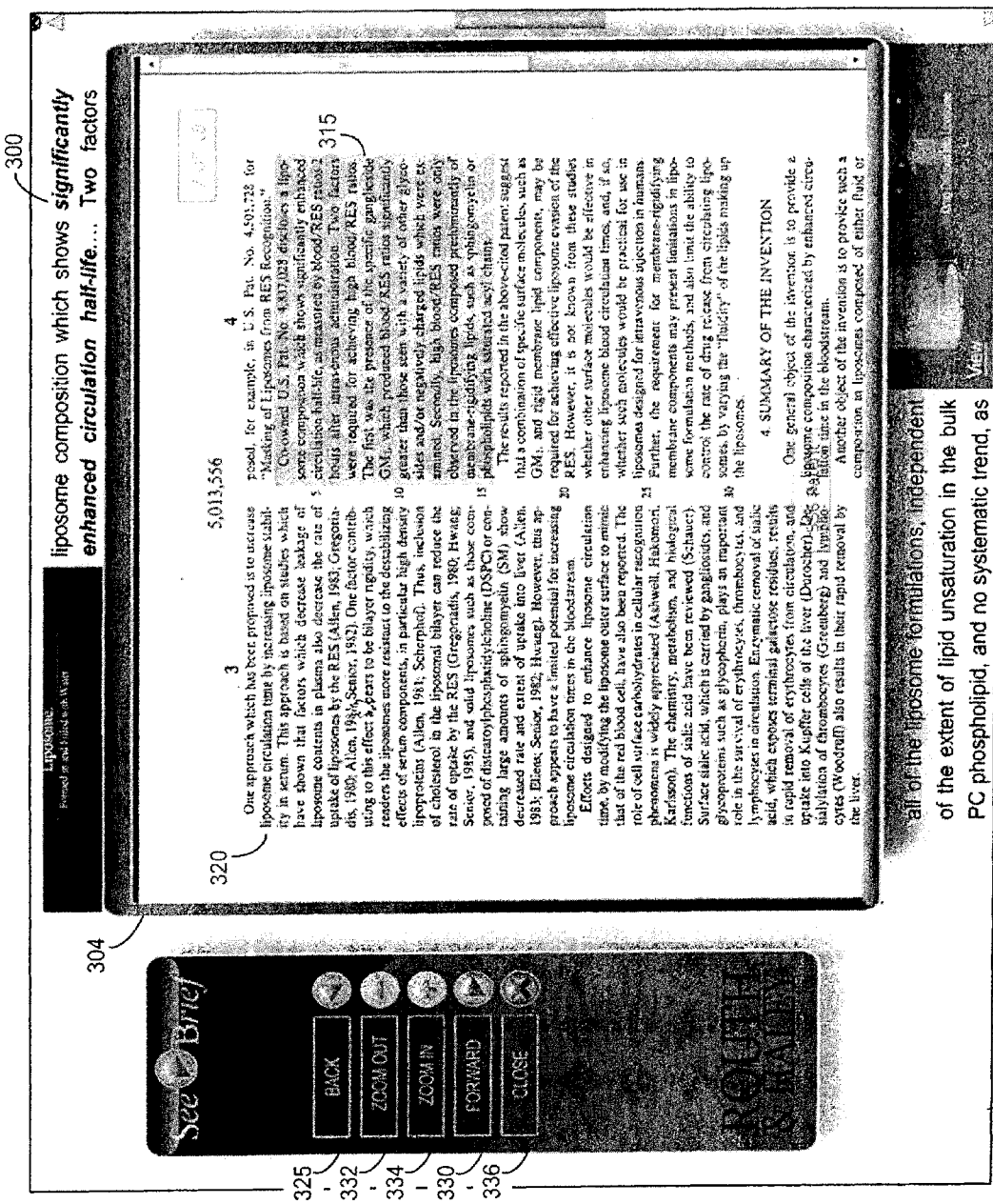
Figure 9:
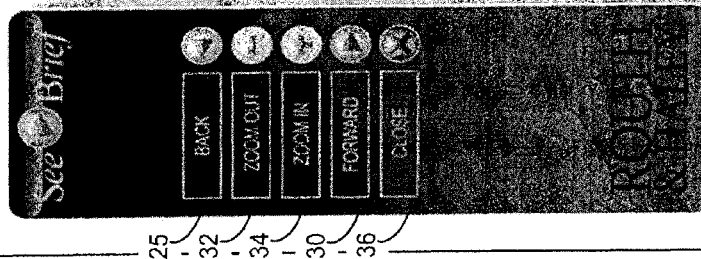

After the creator 157 identifies the first multimedia file 162 (the U.S. patent in FIG. 7), the creator 157 may determine a first portion of the first multimedia file 304 that provides evidence or otherwise supports the concept or logic step described in the first portion of text 154 from the "home" page of the document 300. The creator 157 may also determine the appearance or format of the first portion of the first multimedia file 304 (block 262). For example, the creator 157 may choose to present an enlarged, "zoomed in" view 310 (FIG. 7) of the relevant portion 304, a highlighted view 315 of the relevant portion 304, a combination of zooming and highlighting 320 (FIG. 8), or other formatting. In some embodiments, the viewer 159 may also be able to view other portions of the media file 160 by, for example, scrolling to other pages of the file 160 (as shown in FIG. 9) or by selecting a "previous" 325 or "next" 330 button (FIGS. 7-12). The viewer 159 may also manipulate the displayed media file 304 by zooming in 332 and zooming out 334. The viewer 159 may close the displayed media file 304 by activating the "close" button 336. This concept is illustrated in FIGS. 7-9 which show the same first portion of a multimedia file presented to a viewer in different styles.

Figure 10:
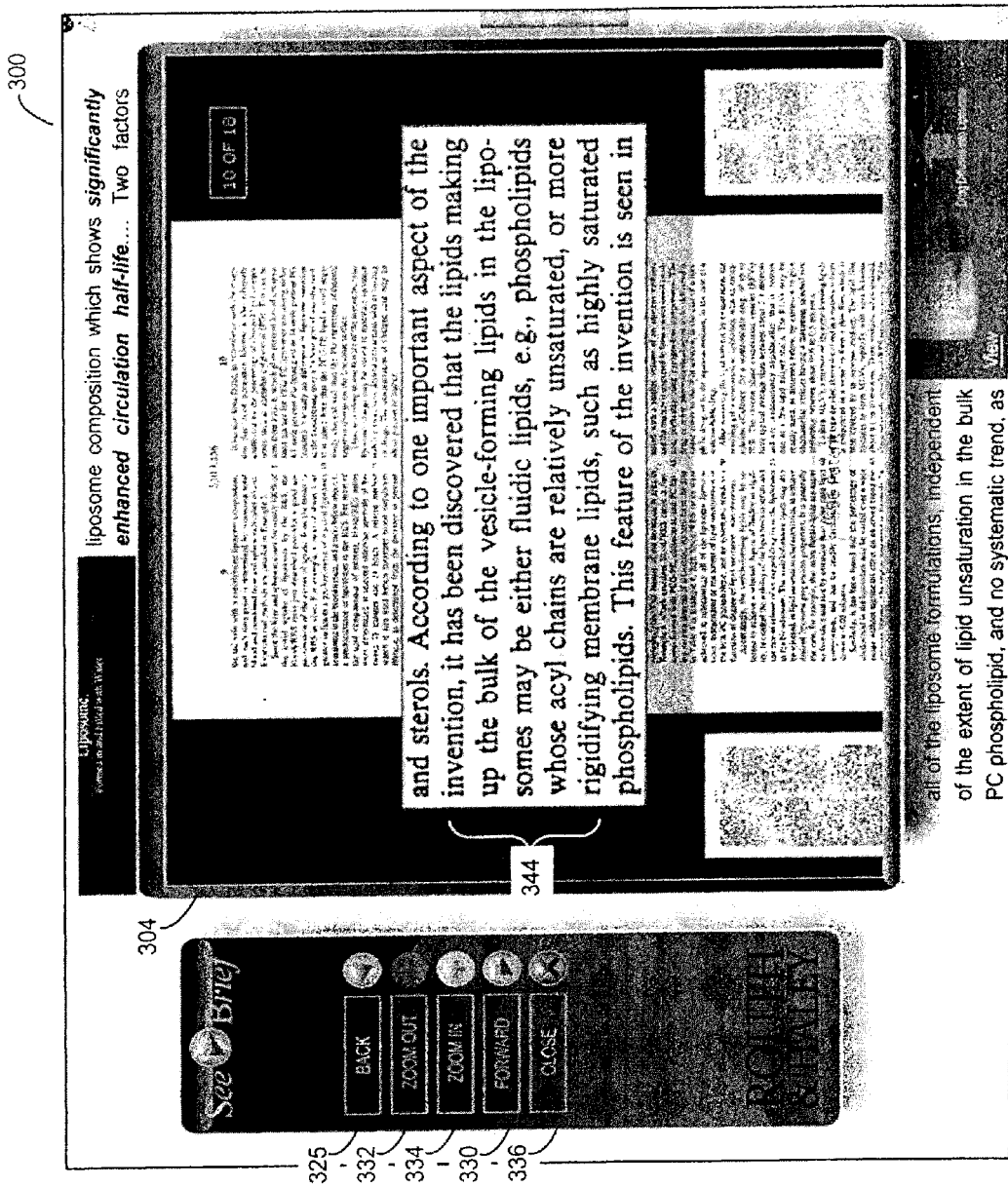

The creator 157 of the dynamic document may use the builder module 71a (FIG. 2) to generate a second link 344 including metadata 172 describing a formatted, second portion of the first media file 304. The second link may allow the viewer 159 to access to the first multimedia file 162 that corresponds to a concept described in a second portion of the text in the dynamic document 340 (FIG. 6) (block 264). The creator 157 may determine a second portion of the first multimedia file 162 to display that corresponds with the concept described in the second portion of text from the "home" page of the text 340, as well as the appearance of the second portion of the first multimedia file (block 266). FIG. 10 illustrates a second portion of the first multimedia file (the U.S. patent) 344. It is also noted that both the first and second portions of the multimedia file (304, 344) hovering over the "home" page of the dynamic document 300 include navigation buttons (325, 330, 332, 334, 336) that allow the viewer to progress to other portions of the multimedia file 162, while maintaining the relationship to the "home" page of the dynamic document 300 (which changes as the viewer progress) without relocating the viewer to the linked file 162.

Figure 12:
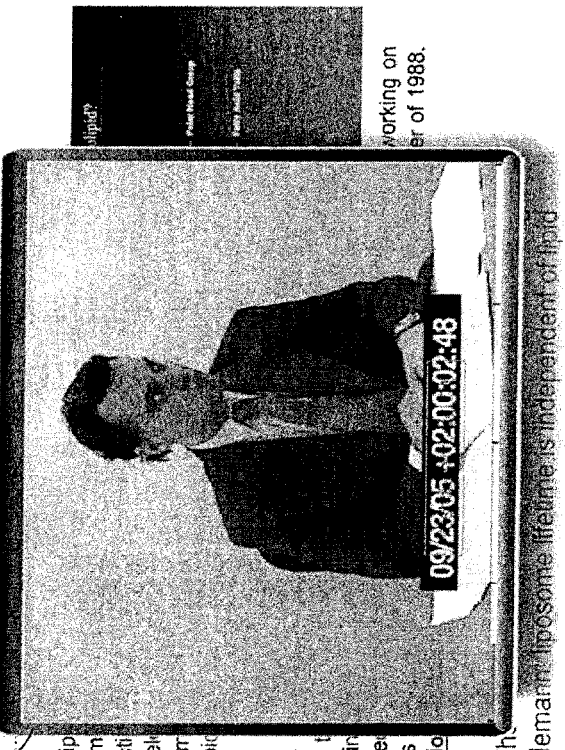

The builder module 71a may also allow the creator 157 to access a second multimedia file, while still in its native format, that corresponds with a concept described in a third portion of the text 350 (FIG. 11) (block 270). This is illustrated in FIG. 12 which shows a "home" page of a dynamic legal brief document 300 that includes a link to "Deposition of Dr. Frank Hanson as page 21." This icon is linked to a second multimedia file which is a video 164, as shown in FIG. 12. The video 164 remains in its native format and is interpreted by a video module of the presenter module 71b rather than being flattened into a PDF document.

After the creator 157 identifies the second multimedia file (the video 164 in FIG. 12), the creator may determine a first portion of the second media file 358 to display that corresponds with the concept described in the third portion of text from the "home" page of the text 350, as well as the appearance of the portion of the second multimedia file (block 272). The creator 157 may then employ the builder module 71a to generate a hyperlink 354 including metadata 174 describing the first portion of the second media file 358 (including format, location within the second media file 164, start and stop times, etc.). Upon selection of the hyperlink 354 by the viewer 159, the presenter module 71b may utilize the metadata 174 to present the formatted first portion of the second media file 358, as described above in relation to FIGS. 4 and 5.

Figure 13:
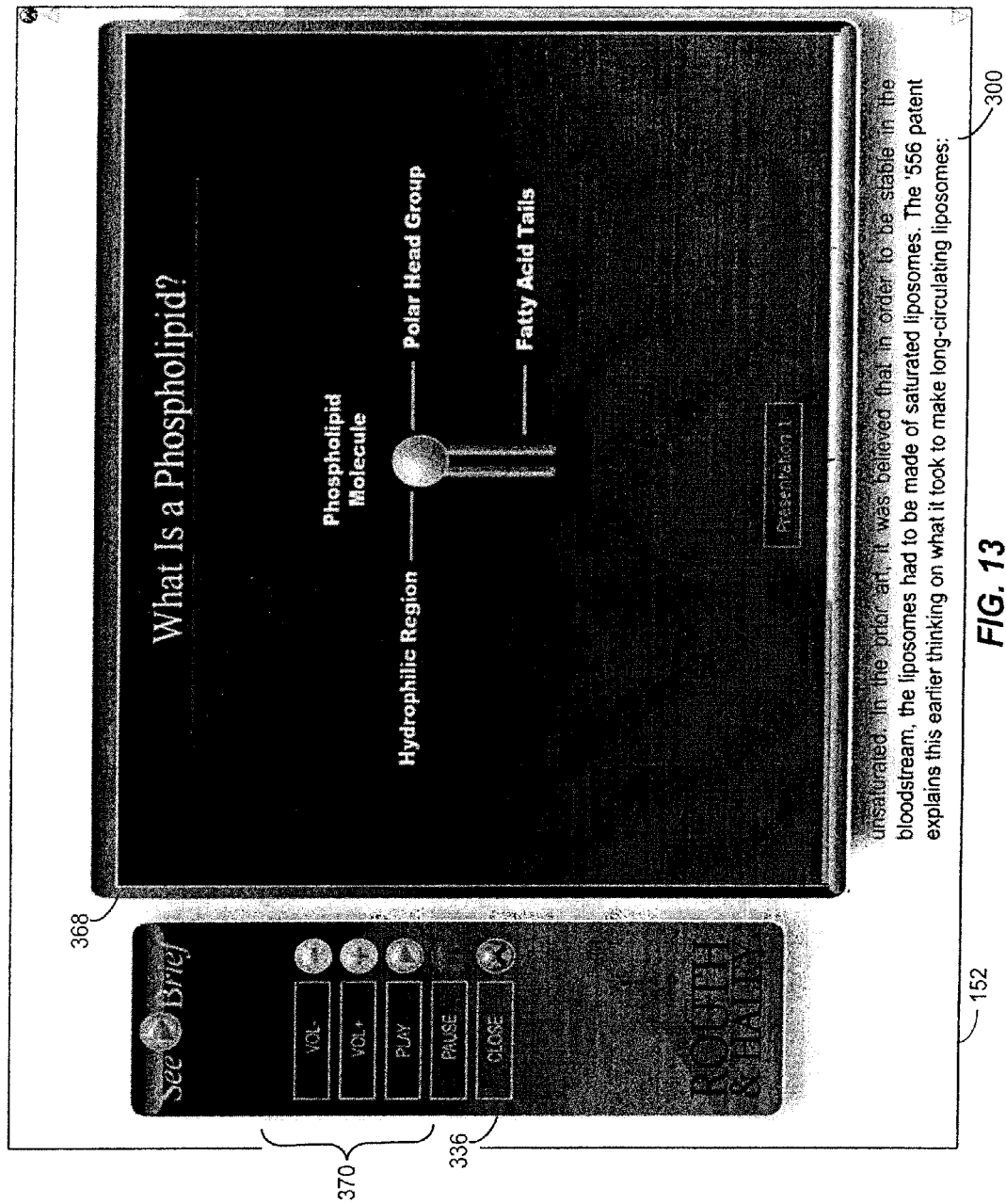

The builder module 71a may also allow the creator 157 to access a third multimedia file, while still in its native format, that corresponds with a concept described in a fourth portion of the text 360 (FIG. 11). This is illustrated in FIG. 12 which shows a "home" page of a dynamic legal brief document 300 that includes an image 362 entitled "What is a Phospholipid?" This image 362 is linked to a third multimedia file which is a voice-narrated graphics file 170, as shown in FIG. 13. The voice-narrated graphics file 170 remains in its native format and is not flattened into a PDF document.

After the creator 157 identifies the third multimedia file (the voice-narrated graphics file 170 in FIG. 12), the creator may determine a first portion of the third media file 358 to display that corresponds with the concept described in the fourth portion of text from the "home" page of the text 350, as well as the appearance of the portion of the third multimedia file (block 272). The creator 157 may then employ the builder module 71a to generate a hyperlink 366 including metadata 180 describing the first portion of the third media file 368 (including format, location within the third media file 170, etc., as previously described). Upon selection of the hyperlink 366 by the viewer 159, the presenter module 71b may utilize the metadata 180 to present the formatted first portion of the third media file 368 (FIG. 13), as described above in relation to FIGS. 4 and 5.

When the media file 160 includes playback features (e.g., audio, video, voice-narrated graphics, etc.) the presenter screen 152 may incorporate controls 370 for the viewer 159 to manipulate the playback of the media file 160. In some embodiments, the controls 370 may include a volume control, a play control, and a pause control.

FIG. 14 is an exemplary illustration of a dynamic document 300 in which a viewer has conducted a key word search (e.g., the word "liposomes"). Because the text of the dynamic document remains in its native format (e.g., vectored or XML format), the identified key words 364 are easily identified and displayed with highlighting. This is substantially more accurate and powerful than a PDF document that is linked to an Optical Character Recognition (OCR) file.

The presenter module 71b may also include a note taking module that allows a viewer 159 to enter text and audio notes to refer and explain particular points within the document 300 upon later viewing.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

This invention can be applied (but not limited) to: legal briefs, expert reports and declarations, including electronic and hosted submissions to courts; sales presentation and proposal bid packages; building multimedia web sites with linked media; reporting scientific or technical findings; publishing technical or operation manuals; or even the storage and retrieval of medical records including test images and video files.

What is claimed is:

1. A computer-implemented method for building and viewing an interactive multimedia document comprising:
   determining metadata describing a location for a media file portion within a media file;
   embedding a reference within a text portion of the interactive multimedia document, the reference including the metadata;
   interpreting the metadata upon selection of the reference; and
   displaying the media file portion over the interactive multimedia document based on the interpreted metadata.

2. The computer-implemented method of claim 1, wherein the media file includes one or more of a text file, an audio file, or a video file.

3. The computer-implemented method of claim 1, wherein the metadata also specifies how the media file portion is displayed over the interactive multimedia document.

4. The computer-implemented method of claim 1, wherein the media file includes a file type including a PowerPoint® presentation, a portable document, a Word® document, and a Windows® Media file.

5. The computer-implemented method of claim 4, further comprising visually formatting the media file portion and displaying the visually formatted media file portion upon selection of the reference.

6. The computer-implemented method of claim 1, wherein the interactive multimedia document is one or more of a legal brief or a memorandum.

7. The computer-implemented method of claim 1, wherein selection of the reference causes a processor to interpret the metadata.

8. The computer-implemented method of claim 1, wherein selection of the reference includes one or more of a roll over action or a clicking action of a mouse device.

9. The computer-implemented method of claim 1, wherein the text portion is in a vector format.

10. The computer-implemented method of claim 1, wherein the metadata describes a visual format of the media file portion.

11. The computer-implemented method of claim 10, wherein the visual format includes one or more of a border, a color, a position of a media window displaying the media file portion, shading, or a highlighting color.

12. A computer-readable storage medium including computer-executable instructions stored thereon that, when executed, cause a computer to:
   determine metadata describing a location for a media file portion within a media file;
   embed a reference within a text portion of the interactive multimedia document, the reference including the metadata;
   interpret the metadata upon selection of the reference; and
   display the media file portion over the interactive multimedia document based on the interpreted metadata.

13. The computer-readable storage medium of claim 12, wherein the metadata also describes a visual format of the media file portion, the visual format including one or more of a border, a color, a position of a media window displaying the media file portion, shading, or a highlighting color.

14. The computer-readable storage medium of claim 12, wherein selection of the reference includes one or more of a roll over action or a clicking action of a mouse device and selection causes a processor to interpret the metadata.

15. The computer-readable storage medium of claim 12, further comprising instructions that, when executed, cause the computer to:
   determine further metadata describing another location for another media file portion within the media file; and
   embed another reference within another text portion of the interactive multimedia document, the reference including the other metadata;
   wherein the interactive multimedia document includes a single copy of the media file.

16. A system for building and viewing an interactive multimedia document at a computer, the system comprising:
   a text document data file;
   a multimedia data file;
   one or more computers including:
   one or more processors configured to execute computer readable instructions; and
   a memory having stored therein processor-executable computer readable instructions, the instructions comprising:
      a builder module to determine metadata describing a location for a media portion within the multimedia data file and to embed a reference within the text document data file, the reference including the metadata; and
      a presenter module to display a text document corresponding to the text document data file, to interpret the metadata upon selection of the embedded reference within the displayed text document, and to display the media portion over the displayed text document based on the interpreted metadata.

17. The system of claim 16, wherein the metadata also describes a visual format of the media portion, the visual format including one or more of a border, a color, a position of a media window displaying the media portion, shading, and a highlighting color.

* * * * *